March 19, 1929. R. P. LANSING 1,705,820
DOOR CONTROLLING AND SIMILAR DEVICE
Filed June 12, 1925
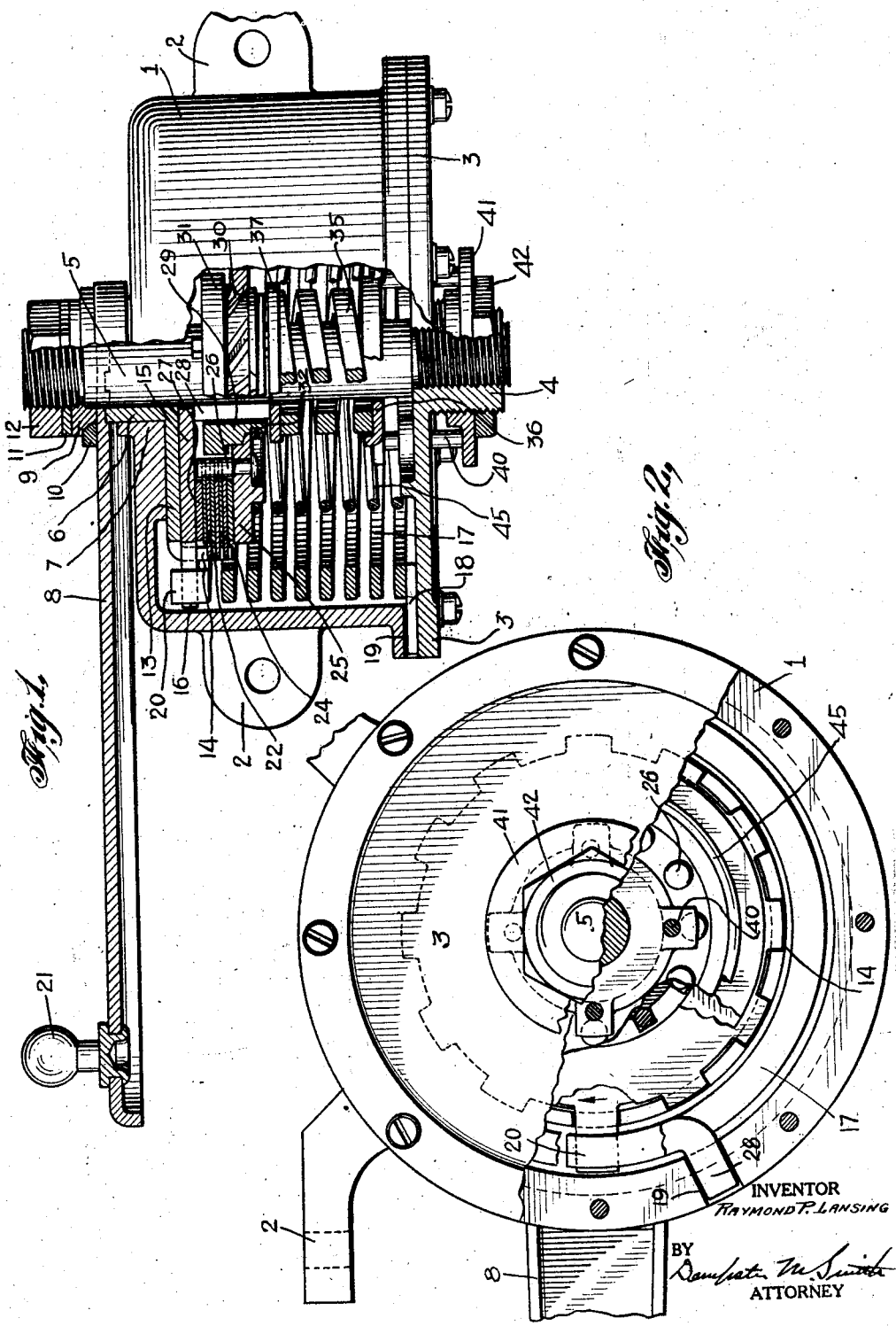

Patented Mar. 19, 1929.

1,705,820

UNITED STATES PATENT OFFICE.

RAYMOND P. LANSING, OF MONTCLAIR, NEW JERSEY.

DOOR-CONTROLLING AND SIMILAR DEVICE.

Application filed June 12, 1925. Serial No. 36,627.

My invention relates to appliances of the class commonly called door checks, which usually include a spring for closing the door and means for resisting the closing movement.

The general object is to provide in simple, compact and durable form, frictional controlling mechanism to cooperate with the door closing or motor spring. In some cases, the spring or its equivalent may be separate from the controlling appliance.

A more particular object is to provide a yieldable member or spring of substantial power which is normally inactive and which is made active to produce pressure at friction surfaces during the closing movement.

Other objects are to provide a limited amount of substantially free or frictionless movement at the beginning of the door closing operation; to provide an additional, subordinate or controlling spring or equivalent means which may be used in addition to the yieldable means or spring above mentioned in some cases, and to provide convenient means for adjusting a pressure member or spring to regulate the friction effect.

The invention as physically embodied consists in structures or arrangements of parts for realizing the above stated and other objects, and the characteristics and advantages of the invention are further sufficiently explained in connection with the following detail description of the accompanying drawing, which shows one exemplifying embodiment. After considering this example, persons skilled in the art will understand that many variations may be made without departing from the invention, and I contemplate the employment of any structures that are properly within the scope of the appended claims.

Fig. 1 is a view, partly in side elevation and partly in section, of a door controller embodying the invention in one form.

Fig. 2 is a view from below, partly in bottom plan, with various parts broken away for explanatory purposes.

A case or housing 1 is provided with lugs 2 for connection to a movable element such as a door. The bottom of the casing is closed by a removable plate 3 having a central boss 4 bored and threaded to receive the threaded end of a spindle 5 which projects through the top of the casing. A sleeve 6 is arranged to turn in a bearing 7 in the casing top and also to turn on an upward portion of the spindle. A lever arm 8 is secured to the outer end of the sleeve and may be adjusted angularly in relation to the sleeve in any suitable way, for instance by the provision of interfitting lugs and notches. The sleeve and lever are held in rotative relation to the spindle and casing by suitable means, such as a nut 9, bearing washer 10, lock washer 11 and lock nut 12 screwed on the upper end of the spindle.

Rigidly connected to the inner end of the sleeve is a plate 13 which has its periphery formed as a down-turned slotted flange, the slots producing spaced lugs or jaws 14. Another plate 15 is located against the under face of plate 13 and has at least one radial lug 16 projecting between two of the lugs 14. A helical motor spring 17 is dimensioned to lie near the casing wall and has one end 18 located in a socket 19 in the casing and secured by the cover 3. The other end 20 of the spring is bent up to engage plate lug 16. When arranged as described as a part of the mechanism and within the casing, the spring provides motive force to close the door acting through lug 16, plates 15 and 13, sleeve 6, and the lever 8 which is provided with means, such as the ball-end fitting 21, for connection to the door frame by a suitable link. Of course, in some cases the housing 1 might be connected to the frame and the lever 8 would then be connected to the door. A separate plate 15 is provided for manufacturing convenience and also to enable the angular position of the lever 8 to be changed by changing the position of plate 15 in relation to plate 13, which may be done when the appliance is partially assembled.

The upper surface of plate 13 in engagement with a substantial surface of the casing top, forms one friction contact of substantial area, but it is desirable to provide additional friction surfaces. In the present example, a suitable plurality of friction discs 22 are connected irrevolubly to plate 13 by peripheral lugs fitting between the jaws 14, and interfitting discs 24 are connected irrevolubly to a pressure plate 25 by sockets engaging pins 26 secured in the plate. Annular spacing discs or washers 27 may be placed between the relatively thin friction discs and plates 15 and 25.

Longitudinal splines 28 are provided on the spindle and the upper ends of these splines may serve to support plate 15. A shifter 29 is arranged for longitudinal movement on the spindle and is properly slotted to cooperate with the splines and prevent shifter rotation. The shifter is provided with a multiple screw thread 30 of suitable pitch, and the central hole in plate 25 is threaded to co-operate with the shifter threads. A flange 31 on the shifter overlies the upper surface of the pressure plate with substantial but moderate clearance, and a stop ring 32 is sprung into an annular groove in the shifter to limit upward movement of the latter in relation to the pressure plate.

Yieldable pressure means in the form of a helical spring 35 of substantial strength is arranged to act between an adjustable abutment 36 and a washer 37 which normally bears against the lower ends of splines 28. The abutment 36 is adjusted and held in position by pins 40 passing through bosses in the cover plate 3, and the pins are in turn supported outside the cover plate by a nut 41 and lock nut 42 engaging a screw thread formed on boss 4. By manipulating the lug 41 and lock nut 42 in an obvious way, the initial pressure of spring 35 may be regulated.

In some cases additional controlling means is provided. This means, in the present example, consists of a relatively light compression spring 45, which may otherwise be identified as an additional or auxiliary spring, acting between cover 3 and pressure plate 25.

With the parts constructed and arranged as shown, when the door is opened, lever 8 moves clockwise as viewed from below in Fig. 2, or, the free ends of the lever moves toward the eye of the observer, in Fig. 1. Motor spring 17 is additionally stressed or tensioned, ready to close the door when that is released. The slight frictional engagement of the friction discs in the first part of the opening movement causes pressure plate 25 to rotate, and shifter 29 is moved upward by the screw action until stopped by stop ring 32 engaging the plate in the position shown in Fig. 1. If the normal or unloaded friction of the discs is not sufficient to accomplish this upward or releasing movement of the shifter, the auxiliary or controlling spring 45 serves to provide sufficient friction pressure for the stated purpose, without opposing any appreciable frictional resistance to door opening.

During the stated opening movement the yieldable pressure means or spring 35 remains inactive, its thrust being taken up between abutment 36 and the lower ends of splines 28.

When the door is released the motor spring commences to close it, slowly at first, and during this first part of the closing movement when considerable acceleration is desired, there is no appreciable frictional resistance, since the rotation of pressure plate 25 by its screw engagement with the shifter, causes the shifter to move downward freely, until the normal clearance between its lower end and spring washer 37 is taken up. Further movement of the pressure plate then causes the shifter to move farther downward in contact with the spring washer, additionally compressing the spring and bringing it into active condition, the spring pressure being transferred through the shifter and pressure plate to friction surfaces of the discs and so to the friction surface of plate 13 in contact with the casing. During this time the discs do not have a relative slip, but resistance is afforded by the work required to compress the spring. This range of movement may be identified as the spring windup period or angle. This condition continues until shifter flange 31 strikes the upper face of the pressure plate, and then further rotation of the plate is prevented; slippage occurs at all the friction surfaces under the full load of the pressure spring and this full friction effect continues substantially constant to the end of the door closing movement, subject, however, to continuously varying resistance as between the door and its casing afforded by the changing angularity of the connecting linkage, as sufficiently understood by persons skilled in this art, without further explanation.

As soon as the door is again slightly opened, shifter 29 is withdrawn upward slightly, sufficient to permit spring washer 37 to seat against the splines 28, and the pressure of the main spring is then taken up or self-contained between fixed points, and has no effect on further door opening movement.

I claim:

1. An appliance of the class described comprising a casing, a spindle therein, a lever arranged for rotation in relation to the casing and spindle, friction means including a rotatable pressure member, a shifter arranged for axial non-rotative movement on the spindle, screw threads connecting the pressure member and shifter, and a pressure spring adjacent the shifter normally held in inactive stressed condition, the shifter being moved by the pressure member in one direction of lever movement and then acting to transfer pressure of the spring effectively to the friction means.

2. An appliance of the class described comprising a casing, a spindle fixed therein, a lever mounted for rotation on the spindle and having a sleeve projecting into the casing, friction discs connected to the sleeve, a pressure member, friction discs connected to the pressure member and interfitting with the discs first mentioned, a shifter splined on the spindle and having screw connection with the pressure member, and a spring normally held in inactive condition, the pressure member being frictionally actuated by movement of the lever in one direction to move the shifter and apply the force of the spring to the friction discs.

3. An appliance of the class described comprising a casing, a spindle fixed therein, a lever mounted for rotation on the spindle and having a sleeve projecting into the casing, friction discs connected to the sleeve, a pressure member, means to limit rotation of the pressure member in one direction, friction discs connected to the pressure member and interfitting with the discs first mentioned, a shifter splined on the spindle and having screw connection with the pressure member, and a spring normally held in inactive condition, the pressure member being frictionally actuated by movement of the lever in one direction to move the shifter and apply the force of the spring to the friction discs.

4. An appliance of the class described comprising a casing, a spindle fixed therein, a lever mounted for rotation on the spindle and having a sleeve projecting into the casing, friction discs connected to the sleeve, a pressure member, means acting between the shifter and pressure plate to limit axial movement of the shifter and rotation of the pressure plate in one direction, friction discs connected to the pressure member and interfitting with the discs first mentioned, a shifter splined on the spindle and having screw connection with the pressure member, and a spring normally held in inactive condition, the pressure member being frictionally actuated by movement of the lever in one direction to move the shifter and apply the force of the spring to the friction discs.

5. An appliance of the class described comprising a casing, a spindle fixed therein, a lever mounted for rotation on the spindle and having a sleeve projecting into the casing, a plate on said sleeve, friction discs connected to the plate, a pressure plate, friction discs connected to the pressure plate and interfitting with the discs first mentioned, a shifter splined on the spindle and having screw connection with the pressure plate, a pressure spring surrounding the spindle and normally held in inactive stressed condition between abutments, the pressure plate being frictionally actuated by movement of the lever in one direction to move the shifter and apply the force of the pressure spring to the friction discs.

6. An appliance of the class described comprising a casing, a spindle fixed therein, a lever mounted for rotation on the spindle and having a sleeve projecting into the casing, a motor spring abutment connected to the sleeve, a motor spring acting on the abutment and also anchored in the casing, friction discs connected to the sleeve, a pressure member, friction discs connected to the pressure member and interfitting with the discs first mentioned, a shifter splined on the spindle and having screw connection with the pressure member, and a spring normally held in inactive condition, the pressure member being frictionally actuated by movement of the lever in one direction to move the shifter and apply the force of the spring to the friction discs.

7. An appliance of the class described comprising a casing, a spindle fixed therein, a lever mounted for rotation on the spindle and having a sleeve projecting into the casing, friction discs connected to the sleeve, a pressure member, friction discs connected to the pressure member and interfitting with the discs first mentioned, a shifter splined on the spindle and having screw connection with the pressure member, a spring normally held in inactive condition, the pressure member being frictionally actuated by movement of the lever in one direction to move the shifter and apply the force of the spring to the friction discs, and auxiliary means for producing slight initial friction for pressure member actuation.

8. An appliance of the class described comprising a casing, a spindle fixed therein, a lever mounted for rotation on the spindle and having a sleeve projecting into the casing, a plate on said sleeve, a motor spring abutment connected to said plate, a motor spring acting on the abutment and also anchored in the casing, friction discs connected to the plate, a pressure plate, friction discs connected to the plate and interfitting with the discs first mentioned, a shifter splined on the spindle and having screw connection with the pressure plate, a pressure spring surrounding the spindle and normally held in inactive stressed condition between abutments, the pressure plate being frictionally actuated by movement of the lever in one direction to move the shifter and apply the force of the pressure spring to the friction discs.

9. An appliance of the class described comprising a casing, a spindle fixed therein, a lever mounted for rotation on the spindle and having a sleeve projecting into the casing, a plate on said sleeve, friction discs connected to the plate, a pressure plate, friction discs connected to the pressure plate and interfitting with the discs first mentioned, a shifter splined on the spindle and having screw connection with the pressure plate, a pressure spring surrounding the spindle and normally held in inactive stressed condition between abutments, the pressure plate being frictionally actuated by movement of the lever in one direction to move the shifter and apply the force of the pressure spring to the friction discs, and auxiliary means for producing slight initial friction for pressure plate actuation.

10. An appliance of the class described comprising a lever arranged for oscillation, friction means, a shifter arranged to move in the direction of the axis of lever oscillation without rotation, yieldable pressure means, and means acting in co-operation with the shifter to make said pressure means effective in one direction of lever movement to provide checking friction in the friction means.

11. An appliance of the class described comprising a lever arranged for oscillation, friction means, a shifter arranged to move in the direction of the axis of lever oscillation without rotation, a spring, and means acting in co-operation with the shifter to make said spring effective in one direction of lever movement to provide checking friction in the friction means.

Signed at Hoboken, in the county of Hudson and State of New Jersey this ninth day of June A. D. 1925.

RAYMOND P. LANSING.